June 30, 1959  J. SARGENT  2,892,346
VOLUME FLOWMETER
Filed June 3, 1955
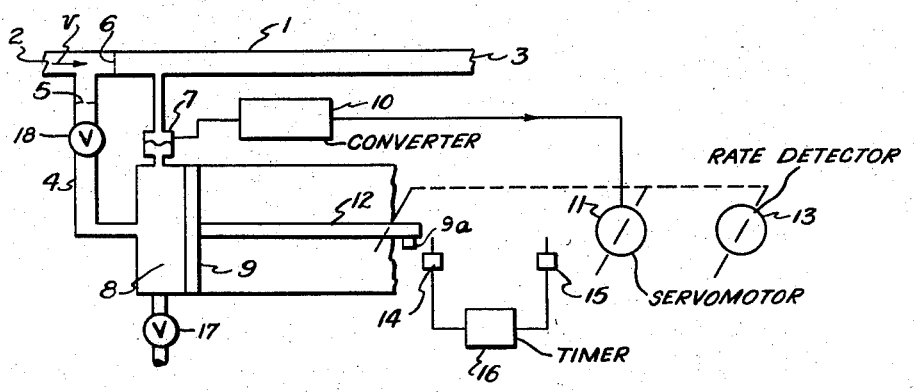
INVENTOR
*Jack Sargent*
BY *Arthur Vinograd*
*Leonard F. Stoll* ATTORNEY
AGENT

United States Patent Office

2,892,346
Patented June 30, 1959

2,892,346

VOLUME FLOWMETER

Jack Sargent, Silver Spring, Md.

Application June 3, 1955, Serial No. 513,172

4 Claims. (Cl. 73—194)

(Granted under Title 35, U.S. Code (1952), sec. 266)

The invention described herein may be manufactured and used by or for the Government of the United States for governmental purposes without the payment to me of any royalty thereon, in accordance with the provisions of 35 United States Code (1952) section 266.

This invention relates to volume flowmeters and more particularly to a volume flowmeter in which the flow is measured by maintaining a fixed pressure while the volume is increased by means of a piston controlled by a servo system.

Many types of fluid flowmeters are known to the prior art but all suffer from one or more of the following disadvantages: they are not primary measuring standards, that is, they must be calibrated; they are not capable of measuring both liquids and gases; they do not measure the volume flow rate of gases and hence are affected by the density of the gases measured, and they are not precision instruments and their stability is generally poor.

One object of this invention therefore is to provide a volume flowmeter which measures the volume rate of gas flow and is independent of the gas density.

Another object of this invention is to provide an improved flowmeter capable of measuring the flow rate of both liquids and gases.

An additional object of this invention is to provide an improved volume flowmeter which is a fundamental measuring device in that the flow is determined by a measure of length and time.

A still further object of this invention is to provide an improved flowmeter in which the total volume flow of the fluid is obtained by a linear measurement of piston displacement.

Still another object of this invention is to provide an improved volume flowmeter in which the overall accuracy is better than 0.1% over a long period of time.

In U.S. Patent 2,320,447 issued June 1, 1943 to Gwynne Raymond there is shown a volume flowmeter in which the fluid flow is diverted from the main flow line into a chamber containing a piston. The force of the fluid on the piston face causes it to move along the chamber. The rate of fluid flow may then be calculated by measuring the piston displacement during a time interval.

The present invention is similar in principle in that the time a piston travels a given distance provides means for calculating the volume flow rate of a fluid. However, the present invention incorporates a pressure differential detector which senses a very slight difference in pressure between some reference pressure, usually ambient, and the pressure in the chamber. The output from this detector energizes a servomechanism which in turn displaces the piston along the chamber an amount sufficient to maintain the pressure differential at a minimum and consequently the reference pressure and the pressure in the piston chamber are maintained substantially equal. A flowmeter constructed in accordance with such features proves a measuring device of improved sensitivity and accuracy as compared to devices such as represented by the referred to patent.

Other uses and advantages of the invention will become apparent upon reference to the specification and drawings in which the single figure of the drawing is a schematic diagram of the volume flowmeter of the present invention.

Referring to the drawing, there is shown a conduit or channel 1 through which a fluid flows in the direction indicated by the arrow labeled V in the drawing. Branching off from channel 1 is an auxiliary or secondary channel 4, generally having a smaller cross-sectional area than that of channel 1. Orifice 5 is situated in channel 4 corresponding to a similar orifice 6 in channel 1. These orifices serve to control the ratio of fluid flowing in auxiliary channel 4 to the fluid flowing through main channel 1.

Since the fluid in channel 4 is used only for measuring purposes it is desirable to extract as small an amount as possible from channel 1 and still have a flow representative of the main flow in channel 1. The amount of fluid diverted from channel 1 into channel 4 is determined by the size of orifices 5 and 6 and is generally in the order of about 1% of the total flow.

A pressure transducer 7 is coupled to a source of reference pressure, in this case the channel 1 downstream from the orifice 6, and also to a chamber 8 containing a piston 9. The reference pressure on the channel 1 side of pressure transducer 7 is that of the usable output flow from channel 1 while the pressure on the other side of transducer 7 is the pressure produced in chamber 8. The pressure transducer 7 may take the form of a diaphragm with a bonded or unbonded strain gage attached thereto. If the strain gage forms part of a Wheatstone bridge which is fed by an A.-C. signal, then the electronic converter 10 shown in the drawing takes the form of a conventional amplifier circuit, or transducer 7 might be of the bellows type likewise feeding a converter 10 in the form of a conventional amplifier. No further description of elements 7 and 10 is felt warranted since both are readily available commercial items.

The output from converter 10 is fed to a servomotor 11 which is in turn mechanically coupled to actuate rod 12 of piston 9. The rotational speed of motor 11 may be measured by means of a rate detector 13 mechanically coupled to motor 11. Rate detectors suitable for such use are well known in the art, for example, that manufactured by the Bendix Company and known as tachometer generator Number 2255-IC.

Start and stop switches 14 and 15 are positioned so as to be actuated successively by a suitable projection 9a fixed to piston rod 12 as the piston slides along chamber 8. The switches 14 and 15 serve to actuate and stop respectively a clock device 16 used to ascertain the amount of time taken for piston 9 to move transversely along chamber 8 in response to a fluid flow measurement. This distance is determined by the physical separation of switch 14 from switch 15.

In the operation of the system, fluid from channel 4 passes into chamber 8 causing an increase in pressure within the chamber. Such increase in pressure creates a pressure difference which is measured by transducer 7 and is transmitted as an electrical signal through converter 10 to servomotor 11. The signal received by motor 11 causes it to translate the piston 9 along chamber 8 in a direction which tends to reduce the pressure difference across transducer 7 to a minimum. Specifically, the piston will be displaced in a direction which will increase the displacement volume in cylinder 8 and correspondingly reduce the pressure difference across transducer 7 to substantially zero. Such servo action is continuous and results in the piston moving along the length of chamber 8 from a position which will trip switch 14 energizing clock device 16, to a subsequent position in which switch 15 is actuated to stop clock device 16.

The average rate of fluid flow can be obtained by registering the time interval required for the piston to move the described distance. The average flow rate is given by the equation $$F_a = \frac{LA}{T} \quad (1)$$

where $F_a$ is the average flow rate (cubic centimeters per minute)

L is the distance between the on and off switches 14 and 15 (centimeters)

A is the cross-sectional area of chamber 8 (centimeters squared)

and

T is the time interval required for the piston 9 to transverse the distance L (minutes).

With the angular rotation of servomotor 11 linearly related to the longitudinal position of piston 9 the instantaneous flow rate is given by the equation $$F_i = KAS \quad (2)$$

where $F_i$ is the instantaneous flow rate (cubic centimeters per minute).

K is the piston travel per one revolution of motor rotation (centimeter/revolution)

and

S is the rotational speed of motor 11 (revolutions per minute).

Equations 1 and 2 show that either the average or instantaneous flow rate can be obtained from the fundamental measures of length and time.

The fluid entering chamber 8 may be exhausted after each measurement through any suitable outlet, for example, a valve 17 situated at the bottom of the chamber. This exhaustion of fluid can be further facilitated by the use of a second valve 18 in auxiliary channel 4 for closing off the flow through that channel while chamber 8 is being exhausted. These or similar expedients should be obvious to one skilled in the art.

As described so far the embodiment shown is a unitary device adapted to be attached to the open end of a flow channel or inserted in a flow line at any suitable junction in the line. In such a case channel 1 forms a continuation of the flow channel being measured. Obviously channel 1 may be considered as the flow line to be measured and having a restriction such as orifice 6. In such case a modified embodiment of the invention would consist of the apparatus shown in the drawing without the main flow channel 1. Such apparatus would then be connected to channel 1 by means of suitable connections.

The second embodiment described above is particularly suited for use in calibrating other flowmeters. In such case, having no main channel 1, the entire flow is lead into chamber 8 through auxiliary channel 4 and transducer 7 may be coupled between chamber 8 and the reference pressure (usually ambient) to which the other flowmeters are being calibrated.

Various modifications of conventional elements will readily occur to those skilled in the art. In place of orifice 5 a splitting valve could be used. The cross section of chamber 8 can take any desired shape, preferably circular or square for convenience. Also numerous mechanical couplings such as rack and pinion, or pulley and metal wire, are possible between servomotor 11, piston 9 and rate detector 13.

It will be apparent that the embodiment shown is only exemplary and that various modifications can be made in construction and arrangement within the scope of invention as defined in the appended claims.

What is claimed is:

1. A volume flowmeter comprising an elongated chamber, piston means included in said chamber forming a region between one end of said chamber and said piston means, means for introducing a flow of fluid to be measured into said region increasing the pressure therein, transducer means coupled between said region and a reference pressure for converting the pressure differential between the pressure in said region and said reference pressure into an error signal, servomechanism motor means responsive to said signal for reducing said pressure differential to substantially zero by causing said piston means to move along said chamber thereby increasing said region and means for timing the movement of said piston means over a given distance the angular rotation of said motor means being linearly related to the position of said piston means and means for measuring the rotational speed of said motor.

2. A volume flowmeter comprising a main channel of fluid flow, an auxiliary channel, means for diverting a portion of the fluid flow in said main channel through said auxiliary channel, a chamber, piston means included in said chamber, means for introducing the flow of fluid from said auxiliary channel into said chamber increasing the pressure therein, transducer means coupled between said chamber and said main channel downstream from said diverting means for changing the pressure differential between the pressure in said chamber and the downstream main channel pressure into an error signal, means responsive to said signal for moving said piston means to reduce said pressure differential to substantially zero and means for timing the movement of said piston means over a predetermined distance.

3. A volume flowmeter comprising a main channel of fluid flow including an orifice, an auxiliary channel, means for diverting a portion of the fluid flow in said main channel through said auxiliary channel, an elongated chamber, piston means included in said chamber forming a region between one end of said chamber and said piston means, means for introducing the flow of fluid from said auxiliary channel into said region increasing the pressure therein, transducer means coupled between said region and a reference pressure for converting the pressure differential between the pressure in said region and said reference pressure into an error signal, said reference pressure being the pressure of the fluid flow in said main channel downstream from said orifice, servomechanism motor means responsive to said signal for reducing said pressure differential to substantially zero by causing said piston means to move along said chamber thereby increasing said region and means for timing the movement of said piston means over a predetermined distance.

4. A volume flowmeter as defined in claim 3 in which the angular rotation of said motor means is linearly related to the position of said piston means and including means for measuring the rotational speed of said motor.

References Cited in the file of this patent

UNITED STATES PATENTS

| 1,105,581 | Rusby | July 28, 1914 |
| 2,088,271 | McCandless | July 27, 1937 |
| 2,104,373 | McNeil et al. | Jan. 4, 1938 |
| 2,320,477 | Raymond | June 1, 1943 |
| 2,353,382 | Barrett | July 11, 1944 |
| 2,505,905 | McAfee | May 2, 1950 |
| 2,529,481 | Brewer | Nov. 5, 1950 |
| 2,621,516 | Zavoico | Dec. 16, 1952 |